Feb. 6, 1923.
C. A. ROWLEY.
APPARATUS FOR STRETCHING SHEET GLASS.
FILED NOV. 1, 1920.

INVENTOR
Clifford A. Rowley

Feb. 6, 1923.
1,444,038
C. A. ROWLEY.
APPARATUS FOR STRETCHING SHEET GLASS.
FILED NOV. 1, 1920.
2 SHEETS-SHEET 2
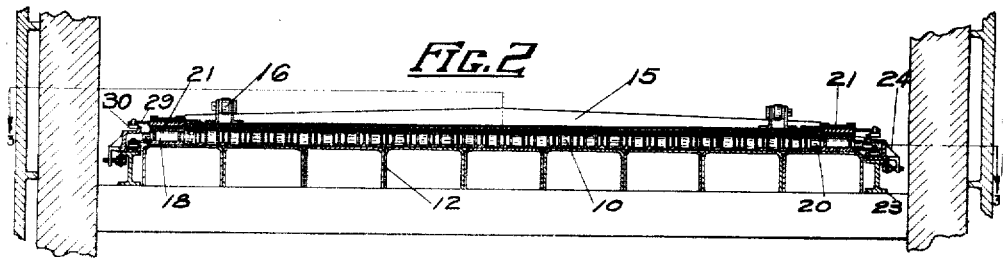
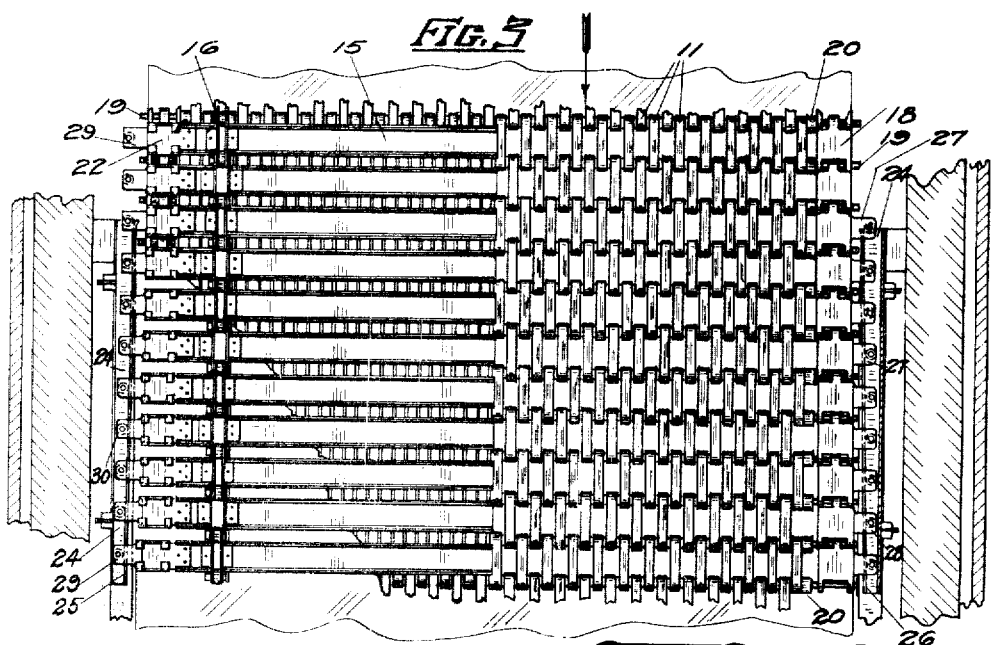
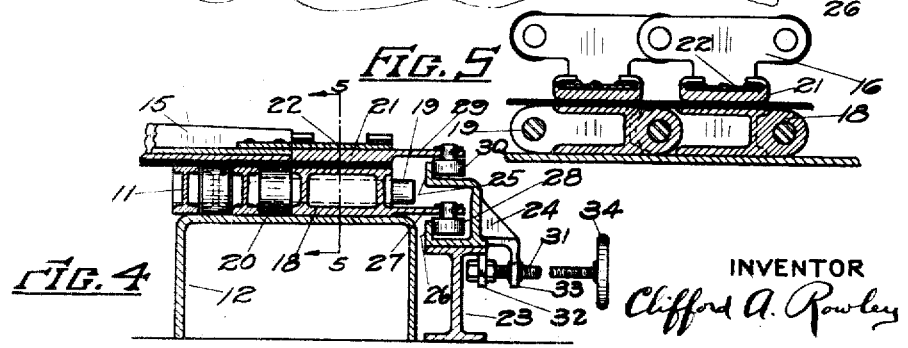
INVENTOR
Clifford A. Rowley Patented Feb. 6, 1923.

1,444,038

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

APPARATUS FOR STRETCHING SHEET GLASS.

Application filed November 1, 1920. Serial No. 420,901.

*To all whom it may concern:*

Be it known that I, CLIFFORD A. ROWLEY, a citizen of the United States, residing at Toledo, in the county of Lucas and State of Ohio, have invented new and useful Improvements in Apparatus for Stretching Sheet Glass, of which the following is a specification.

This invention relates to the art of drawing glass in sheet form from a molten mass of glass, and is concerned more particularly with an apparatus for stretching the sheet laterally, while it is being drawn, to flatten the same and improve the quality of the sheet.

While the invention is adaptable to any form of sheet drawing apparatus, it is here shown as an improvement or addition to the apparatus disclosed in the patents to I. W. Colburn, 1,248,809, dated Dec. 4, 1917, and 1,274,385, dated Aug. 6, 1918. In this patented apparatus, a sheet of glass is drawn upwardly from a bath of molten glass, bent into a horizontal plane, reheated, and then passes through a drawing mechanism which gives the required longitudinal pull to draw the continuous sheet from its molten source, and at the same time flattens the reheated and softened sheet into its final form. The present invention so modifies this apparatus that the glass sheet is stretched laterally, while engaged by the drawing mechanism, to further flatten the sheet, and remove waves and wrinkles. The result to be accomplished is the same as contemplated in the copending application of Seth B. Henshaw, Serial Number 406,577, filed Aug. 28, 1920. In the present invention, the gripping devices, which grasp the edges of the sheet to pull the sheet longitudinally, are simultaneously moved laterally to stretch the sheet in width. In this way, a steady and substantially uniform tension is applied in all directions over a considerable area of the sheet, to draw out waves or corrugations and produce a smooth and flat sheet.

The exact nature and objects of this invention will become more apparent as the following detailed description of one approved form of apparatus for carrying out the invention proceeds.

Referring to the accompanying drawings:

Fig. 2 is a vertical transverse section through the sheet drawing mechanism, substantially on the line 2—2 of Fig. 1.

Fig. 3 is a partial plan view of the drawing mechanism parts being cut away substantially on the line 3—3 of Fig. 2, and a portion of the draw-table being omitted beneath the draw-bars at the left hand side of the figure, for the sake of clearness.

Fig. 4 is an enlarged transverse section of one end of the apparatus as shown in Fig. 2.

Fig. 5 is a partial vertical section, substantially on the line 5—5 of Fig. 4.

Figure 1:
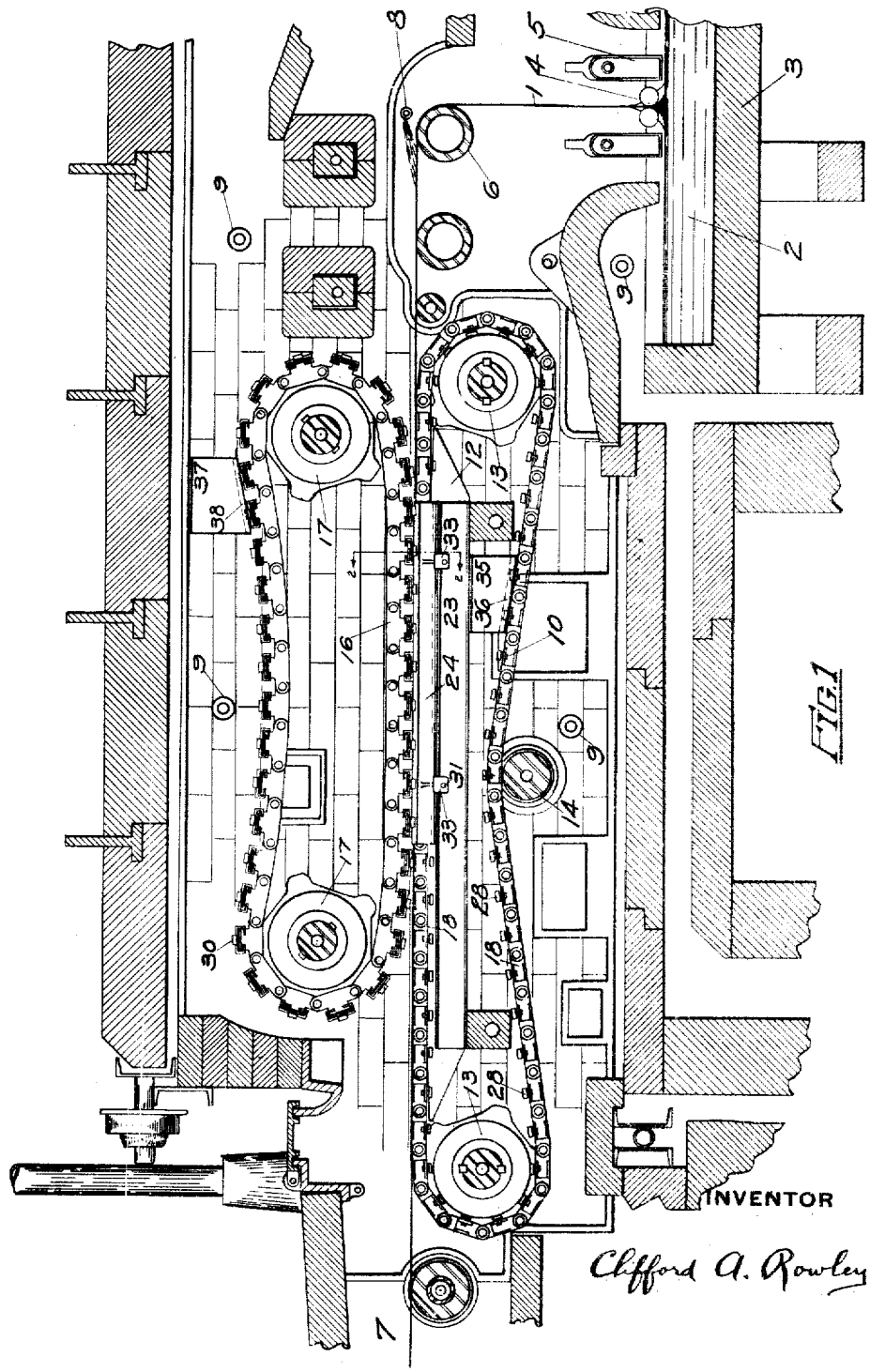
Figure 1, is a vertical longitudinal section through a sheet drawing machine of the Colburn type with the present invention applied thereto.

Referring first to Fig. 1, the glass sheet 1 is drawn up from the bath of molten glass 2, in receptacle 3, between edge forming rollers 4, and coolers 5, then bent over cooled bending roller 6, and passed off horizontally through the drawing mechanism and into the annealing leer 7, all as shown and described more particularly in Patent 1,248,809, above noted. After leaving the bending roll 6, the sheet is reheated and softened by burners 8, and the temperature of the sheet and of the various parts of the apparatus is regulated by suitably arranged burners, some of which are illustrated by way of example at the various points 9. The mechanism for applying the longitudinal draft, whereby the sheet is continuously pulled from the molten mass is substantially of the form set forth in Colburn Patent 1,274,385, referred to above. It comprises a suitable carrier or draw-table 10, in the form of an endless flexible chain of closely intermeshing links 11. The table is of substantially the width of the sheet to be drawn, and is supported throughout its upper run by the stationary table 12. The flexible draw-table is carried at its ends, and driven by, the sprockets 13, and the lower return run of the loop is supported by the idler roll 14. Above the sheet is arranged an endless series of transverse draw-bars 15, carried by sprocket chains 16, supported and driven by sprockets 17. These draw-bars 15 are usually U-shaped in cross-section, and bear on the glass sheet adjacent their ends only; the drawing process forming the glass sheet with thicker edge portions. If desired the draw-bars could be bowed upwardly at their centers to insure end contact only with the sheet. This endless series of draw-bars is of considerable weight, and its lower run rests upon the edge portions of the glass sheet, gripping the sheet between the draw-bars and draw-table, which move synchronously thus imparting continuous longitudinal movement to the sheet. At the same time the reheated and softened sheet is flattened out upon the upper plane surface of the draw-table. All of the above is substantially the same as set forth in the Colburn patents referred to above.

By the present invention, the mechanism described above is somewhat altered and added to, whereby a lateral stretch is imparted to the glass sheet while on the draw-table. At each edge of the draw-table the outer rows of links, which would comprise the surface whereon the glass sheet is clamped, are replaced by a series of loosely interlocking links 18, each link 18 being pivoted at its ends on the adjacent pair of pivot pins or shafts 19, and being capable of a limited amount of sliding movement lengthwise of these pins. The central links 11 are held against sliding movement on the pins by collars 20. The end portions of each draw-bar 15, which rest on the glass sheet, are made in the form of separate extensions 21, each slidable on an extension 22 of the main draw-bar.

Adjustably mounted on suitable supports, such as the I beams 23, at each side of the supporting table 12, are guide frames 24, having flanged extensions 25 and 26 forming upper and lower trackways. The slidable draw-table links 18, have outwardly projecting portions 27, provided with rollers or other projections 28, which travel on the tracks 26, whereas the slidable extensions 21 of the draw-bars have projections 29, provided with rollers 30 or their equivalent, which travel on tracks 25. As shown in Fig. 3, the tracks 25 and 26 curve outwardly in the direction of travel of the sheet, the pairs of tracks at the opposite edges of the sheet being further apart at the discharge end of the draw mechanism than they are at the receiving end. The track 25 is of the same curvature, and at all points lies directly above the track 26, so that the rollers 28 and 30, and the respective pairs of slidable sheet gripping members 18 and 21 will at all times move equally and in unison. The positions of the track carrying frames 24, may be adjusted in or out to vary the amount of sliding movement imparted to the gripping members, by means of adjusting screws 31, mounted in ears 32 on the support 23, and screwing into ear extensions 33 on frame 24. If desired the screws 31 can be extended through the sides of the machine frame and provided with suitable hand-wheels 34, as indicated in Fig. 4, so that adjustments can be made from outside of the machine.

Arranged at any suitable point along the idle run of the draw-table is a member 35, (see Fig. 1), carrying an inclined trackway 36, which functions to return the links 18 to their initial inward position. A similar member 37, having an inclined trackway 38, is mounted above the idle run of the draw-bars to return the extensions 21 to their extreme inner position.

In operation, the drawn sheet after being bent into the horizontal plane and reheated, passes into the drawing mechanism where its edge portions are successively gripped between the pairs of members 21 and 18. Shortly after each pair of gripping members 21 and 18 have engaged the sheet, the rollers 30 and 28 thereon are engaged by the diverging tracks 25 and 26, and as the endless drawing chains move forward, the gripping members 21 and 18 are caused to move outwardly, transverse of the glass sheet, tending to pull the sheet laterally in both directions and stretch the same sidewise. As there is a longitudinal pull on the sheet in one direction imparted by the drawing mechanism, and in the other direction due to the viscosity of the molten glass from which the sheet is drawn, practically the entire area of the sheet resting on the draw-table will be subjected to a considerable tension in all directions simultaneously. This will tend to smooth out and flatten the sheet, removing corrugations and wrinkles, and improving the quality of the finished product.

If any lumps or other foreign substances should be drawn into the glass sheet, making it of more than normal thickness, the draw-bars may ride up over this obstruction, the rollers 30 riding up on, or even passing off from the track 25 without damaging the mechanism. If found desirable, the rollers 30 and 28 may be omitted, and simple right-angled extensions on the members 29 and 27, substituted therefor. These extensions would have a sliding contact with the tracks 25 and 26.

Obviously this invention is not limited to use with the specific form of drawing mechanism illustrated, but could be added to any form of drawing mechanism of the endless belt type.

I claim:

1. In a sheet glass drawing apparatus, means for gripping the edges of the sheet, and means for simultaneously moving the gripping means longitudinally and laterally of the sheet.

2. In a sheet glass drawing apparatus, means for supporting the sheet, means for gripping the sheet edges, to draw the sheet longitudinally, and means for causing the edge gripping means at the two sheet edges to move apart laterally in the plane of the sheet, to simultaneously draw, stretch and flatten the sheet.

3. In a mechanism for drawing a continuous sheet of glass, endless draw members for gripping the opposite faces of the edges of the sheet and pulling the sheet lengthwise, and means for causing the draw members at each sheet edge to move laterally in the plane of the sheet away from the draw member at the other sheet edge, to simultaneously stretch and flatten the sheet.

4. In an apparatus for drawing continuous sheet glass, wherein the glass sheet is drawn vertically from a receptacle containing molten glass, bent into the horizontal plane, and then reheated to soften and flatten the same, a drawing and stretching mechanism, comprising an endless carrier or draw-table, an endless series of clamping members gripping each edge of the sheet against the table, means for simultaneously moving the clamping members and table longitudinally of the sheet to draw the same, and means for causing the clamping members and gripping portions of the table to move laterally while gripping the sheet, to stretch the sheet toward its edges.

5. In an apparatus for drawing continuous sheet glass, wherein a sheet of glass is drawn from a mass of molten glass, mechanism for drawing the sheet and stretching it laterally, comprising an endless carrier or draw-table for supporting the sheet, two endless series of clamping members traveling in unison with the draw-table, one series at each edge of the opposite faces of the sheet and gripping the sheet against the edge portions of the table, the clamping members and gripping portions of the table each being capable of a limited lateral movement, and means for causing the two series of clamping members and gripping portions of the table to simultaneously and in unison move laterally in opposite directions while gripping and drawing the sheet, thereby increasing the width of the sheet.

6. In an apparatus for drawing continuous sheet glass, wherein a sheet of glass is drawn from a mass of molten glass, mechanism for drawing the sheet and stretching it laterally, comprising an endless carrier or draw-table for supporting the sheet, two endless series of clamping members traveling in unison with the draw-table at the opposite face of the sheet, each edge of the sheet being gripped between one series of clamping members and the edge portion of the table, and guide members for causing these sheet gripping devices to move laterally while engaging the sheet.

7. In an apparatus for drawing continuous sheet glass, wherein a sheet of glass is drawn from a mass of molten glass, mechanism for drawing the sheet and stretching it laterally, comprising an endless carrier or draw-table for supporting the sheet, two endless series of clamping members traveling in unison with the draw-table at the opposite face of the sheet, each edge of the sheet being gripped between one series of clamping members and the edge portion of the table, guide members for causing these sheet gripping devices to move laterally while engaging the sheet, and guide members for returning the gripping devices to their initial position while out of engagement with the sheet.

8. In an apparatus for drawing continuous sheet glass from a receptacle containing molten glass, four endless series of gripping devices, one series engaging each face of each edge portion of the glass sheet, means for moving the devices in unison lengthwise of the sheet to draw the sheet from the molten mass, and means at each edge of the sheet for guiding the adjacent pair of sheet gripping devices outwardly away from the center line of the sheet while in engagement with the sheet.

9. In an apparatus for drawing continuous sheet glass, gripping means for engaging the opposite faces of each edge portion of the sheet, means for moving the gripping means in unison lengthwise of the sheet to draw the sheet from its source, and means to simultaneously move the gripping devices laterally at the respective edges of the sheet, to stretch the sheet laterally.

10. In a continuous sheet glass drawing apparatus, means for gripping the edges of the drawn sheet, means for moving the gripping means longitudinally with the sheet to draw more sheet from the molten source, and means for simultaneously moving the gripping means laterally, to stretch that portion of the sheet gripped thereby.

11. In a continuous sheet glass drawing apparatus, means for gripping the edges of the drawn sheet, means for moving the gripping means longitudinally with the sheet to draw more sheet from the molten source, traveling sheet supporting means moving between and with the two edge gripping means, and means for simultaneously moving the edge gripping means laterally to stretch that portion of the sheet carried by the supporting means.

Signed at Toledo, in the county of Lucas and State of Ohio, this 29th day of October, 1920.

CLIFFORD A. ROWLEY.